United States Patent [19]

Gut et al.

[11] Patent Number: 4,705,066

[45] Date of Patent: Nov. 10, 1987

[54] SPACE STATIC PRESSURE CONTROL

[75] Inventors: Edward B. Gut, Morton Grove; Mario M. V. Orrico, Chicago, both of Ill.

[73] Assignee: Honeywell Inc., Minneapolis, Minn.

[21] Appl. No.: 325,514

[22] Filed: Nov. 27, 1981

[51] Int. Cl.[4] .................................................. G05D 16/00
[52] U.S. Cl. ........................................ 137/486; 98/1.5
[58] Field of Search ............................. 137/486; 98/1.5

[56] References Cited

U.S. PATENT DOCUMENTS

| | | | |
|---|---|---|---|
| 2,407,258 | 9/1946 | DelMar | 98/1.5 |
| 2,435,819 | 2/1948 | Crever | 98/1.5 |
| 3,145,638 | 8/1964 | Fischer | 98/1.5 |
| 3,410,191 | 11/1968 | Jackson . | |
| 3,465,666 | 9/1969 | Knab . | |
| 3,611,906 | 10/1971 | Lorenz . | |
| 3,977,466 | 8/1976 | Johansson . | |
| 4,175,934 | 11/1979 | Lang et al. . | |

Primary Examiner—Alan Cohan
Attorney, Agent, or Firm—Donald J. Lenkszus

[57] ABSTRACT

A system for controlling static pressure within a controlled space having an air flow sensor mounted in a hole in a wall in a controlled space for sensing the amount of air moving through the hole, a check valve associated with the air flow sensor for allowing air flow past said air flow sensor in only one direction, and an air flow controller connected to the air flow sensor and responsive thereto for controlling static pressure within the controlled space. A damper may be located in a supply duct for controlling the supply of air to the space and a second air flow sensor may be connected between the first air flow sensor and the damper and located to sense the air flowing through the supply duct so that changes in air flow in the supply duct can be controlled by the damper before such changes effect the static pressure within the controlled space.

11 Claims, 1 Drawing Figure

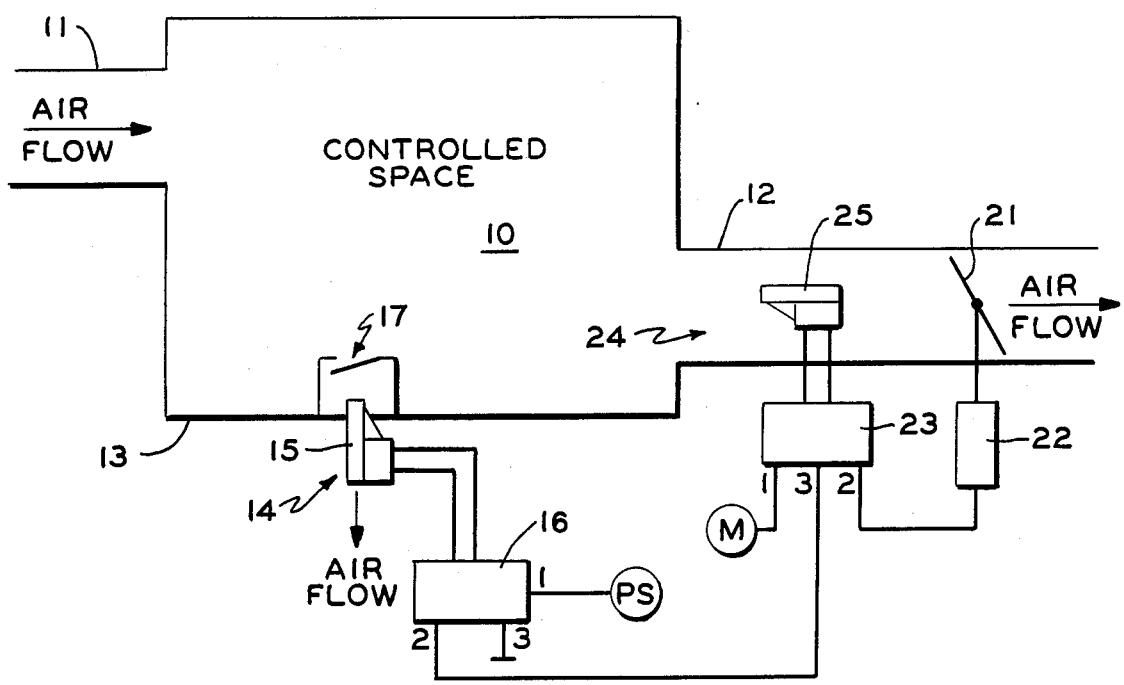

SPACE STATIC PRESSURE CONTROL

BACKGROUND OF THE INVENTION

The present invention relates to a system for controlling the static pressure within a controlled space and, more particularly, to a system which senses the amount of air moving through a hole in the wall in the controlled space for controlling the static pressure therein.

In many applications, it is desirable for controlling the static pressure within a controlled space. For example, in the so called "clean rooms" used, for example, in semiconductor processes and various kinds of laboratories, it is necessary to keep the static pressure within the controlled space above the static pressure of the area outside of the controlled space. This will ensure that contaminants from outside of the controlled space will not migrate into the controlled space. In other applications, such as experiments in laboratories which may produce harmful contaminants, it may be necessary to confine these contaminants within the controlled space. Thus, the static pressure within the controlled space is controlled at a point below the static pressure outside of the controlled space to ensure that such contaminants will not migrate outside of the controlled space.

The prior art has raised or lowered the static pressure within a space either above or below the static pressure outside of the space by placing a fan either in the supply duct to the space or in the exhaust duct. However, such systems did not control the static pressure within the space. Thus, such systems often wasted energy because the fans had to be continually operated at a point to ensure that, during extreme conditions, the space static pressure was either above or below the static pressure outside of the space, as desired. On the other hand, it has been known to utilize static pressure sensors for directly sensing the static pressure within a space to control the amount of air either supplied to the space or exhausted therefrom. Such systems, however, tended to be complex and, therefore, expensive and less reliable. Also, static pressure does not follow a linear relationship with air volume.

The use of a velocity sensor in this type of application has the advantages of being able to control accurately air flows having much smaller values than those for which static pressure sensors can be used, to provide a linear relationship between the velocity of air being sensed and the amount of air being controlled, and to provide a simpler overall system.

It has been known to use velocity sensors for controlling the pressure differential between the interior and exterior of a building. Such prior art systems, however, have at least two disadvantages. First, the velocity sensor itself does not know which way air is passing through it. Thus, it may be possible, as a result of sudden changes in conditions, such as a sudden reversal in air flow moving through the sensor or under start up conditions, that the velocity sensor will control the static pressure within the building at a point negative to the point at which it is designed to control the static pressure. Moreover, unless the air moving through the supply or exhaust duct is also sensed, any changes in static pressure within the duct will not reach the velocity sensor mounted in the wall of the building without a time lag which depends upon the location of the velocity sensor with respect to the duct and the size of the controlled space. This time lag can be substantially reduced by adding a second air flow sensor within the duct itself.

SUMMARY OF THE INVENTION

Thus, according to one embodiment of the invention, an air flow sensor is mounted in a hole in a wall of a controlled space for sensing the amount of air moving through the hole, an air flow controller responds to the air flow sensor for controlling the static pressure within the controlled space, and a check valve is associated with the air flow sensor for ensuring that air will flow through the sensor in only one direction.

In a second embodiment of the invention, a first air flow sensor is mounted in one of the ducts associated with the controlled space for sensing the amount of air moving through the duct, and a second flow sensor mounted in a hole in a wall of the controlled space for sensing the amount of air moving through a hole and connected to the first air flow sensor, the first air flow sensor essentially controlling the flow of air, independent of duct static pressure, within the duct and the second air flow sensor controlling the static pressure within the space.

BRIEF DESCRIPTION OF THE DRAWING

These and other features and advantages will become more apparent from a detailed consideration of the invention when taken in conjunction with the drawing in which the single FIGURE shows a schematic diagram of the present invention.

DETAILED DESCRIPTION

Controlled space 10 has connected thereto supply duct 11 for supplying air to controlled space 10 and exhaust duct 12 for exhausting air from controlled space 10. In wall 13 of controlled space 10 is located velocity sensor 14 which may be a Honeywell CP980 which comprises a sensing head 15 located in the hole in wall 13 and controller 16 having its port 1 connected to a source of main pressure, its port 3 plugged off and its port 2 acting as an output. Velocity sensor 14 senses the velocity of air moving through the hole in which sensing head 15 is located. Because sensing head 15 is insensitive to the direction of air moving through the hole in which sensing head 15 is located, check valve 17 is connected across sensing head 15. As shown, check valve 17 is arranged for allowing air to move only from within controlled space 10 through sensing head 15 to the exterior of controlled space 10, it being understood that, if the static pressure within controlled space 10 is to be controlled below the static pressure outside of controlled space 10, then check valve 17 can be arranged for allowing air to flow only through sensing head 15 and into controlled space 10. Any tendency of the air to flow in the opposite direction will close the check valve preventing the opposite flow.

Located within exhaust duct 12 is damper 21 for controlling the amount of air being withdrawn from controlled space 10, it being understood that damper 21 could also be located within supply duct 11. Damper 21 is driven by damper motor 22 which receives an input from the output port 2 of controller 23 of second velocity sensor 24 the sensing head 25 of which is located within duct 12 for sensing the velocity of air moving through that exhaust duct. Port 1 of controller 23 is connected to a main source of supply pressure and control port 3 is connected to output port 2 of controller 16.

Output port 2 of controller 16 can be connected directly to damper motor 22 for adjusting damper blade 21 to control the static pressure within controlled space 10. However, changes in static pressure within exhaust duct 12 must first be transmitted through controlled space 10 before this change in static pressure has an effect upon velocity sensor 14. Then, velocity sensor 14 must react through velocity sensor 24 to control damper 21 to readjust the static pressure within controlled space 10. This operation can take an excessive amount of time resulting in improper control of static pressure within controlled space 10. By placing second velocity sensor 24 in a position to sense air flow through exhaust duct 12, any changes in the air flow through duct 12 that may result, for example, from or in changes in static pressure within exhaust duct 12 can be sensed immediately and controlled immediately before these changes in air flow and static pressure reach controlled space 10. Any changes in static pressure within controlled space 10 brought about by other occurrences will be controlled by velocity sensor 14.

The system shown in the drawing controls space 10 at a positive static pressure with respect to the static pressure external to space 10. If, on the other hand, the static pressure within space 10 is to be controlled at a negative value, check valve 17 is arranged to allow air to flow through sensor head 15 and into space 10. Also, sensor 24, damper motor 22, and damper 21 are moved to control air flowing through supply duct 11.

The embodiments of the invention in which an exclusive property or right is claimed are defined as follows:

1. A system for controlling the static pressure within a space, said controlled space having duct means for moving air through said controlled space, said system comprising:
   air flow sensor means mounted to sense air moving through a hole in a wall of said controlled space;
   a check valve associated with said air flow sensor means for allowing air flow past said air flow sensor means in only one direction; and,
   air flow control means connected to said air flow sensor means and responsive thereto for controlling static pressure within said controlled space.

2. The system of claim 1 wherein said air flow sensor means comprises a first velocity sensor for sensing the velocity of air moving through said hole.

3. The system of claim 2 wherein said air flow control means comprises damper means located within said duct means for controlling the amount of air moving through said controlled space.

4. The system of claim 3 wherein said air flow control means further comprises second velocity sensor means located in said duct means, said second velocity sensor means connected between said first velocity sensor and said damper means whereby said second velocity sensor primarily controls said damper means in response to changes in air flow in said duct means and said first velocity sensor controls said damper means primarily in response to changes in air flow through said hole.

5. The system of claim 1 wherein said air flow control means comprises air flow sensor means for sensing the amount of air moving through said duct means, said air flow sensor means of said air flow control means being primarily responsible for controlling the air moving through said duct means in response to changes in air flow in said duct means and said air flow sensor means associated with said check valve being primarily responsible for sensing air moving through said hole.

6. The system of claim 2 wherein said air flow sensor means associated with said check valve comprises a first velocity sensor and said air flow sensor means associated with said air flow control means comprises a second velocity sensor.

7. A system for controlling the static pressure within a controlled space, said space having an air supply duct and an air exhaust duct, one of said ducts having a damper mounted therein and a motor associated with said damper for controlling the position of said damper, said system comprising:
   first air flow sensing means mounted in one of said ducts for sensing the amount of air moving therethrough, said first air flow sensing means having an output connected to the motor associated with said damper and further having an input; and,
   second air flow sensing means mounted to sense air moving through a hole in a wall of said controlled space, said second air flow sensing means having an output connected to the input of said first air flow sensing means; and,
   a check valve associated with said second air flow sensing means for allowing air flow past said second air flow sensing means in only one direction; and,
   whereby said second air flow sensing means controls through said first air flow sensing means static pressure within said controlled space.

8. The system of claim 7 wherein said second air flow sensing means comprises a velocity sensor.

9. The system of claim 8 wherein said first air flow sensing means comprises a velocity sensor.

10. The system of claim 7 wherein said first air flow sensing means comprises a velocity sensor.

11. The system of claim 8 wherein said first air flow sensing means comprises a velocity sensor.

* * * * *